United States Patent [19]

Haussmann et al.

[11] Patent Number: 5,002,139

[45] Date of Patent: Mar. 26, 1991

[54] DRILLING TOOL

[75] Inventors: August Haussmann, Oberzell; Wolfgang Peetz, Fronreute-Blitzenreute; Bernhard Moser, Altshausen, all of Fed. Rep. of Germany

[73] Assignee: Hawera Probst GmbH & Co., Fed. Rep. of Germany

[21] Appl. No.: 378,769

[22] Filed: Jul. 12, 1989

[30] Foreign Application Priority Data

Jul. 16, 1988 [DE] Fed. Rep. of Germany ....... 3824170
Jun. 10, 1989 [DE] Fed. Rep. of Germany ....... 3919095

[51] Int. Cl.⁵ .................... E21B 4/06; E21B 10/44; E21B 37/00
[52] U.S. Cl. .................. 175/293; 175/323; 175/415; 166/173; 15/104.2; 408/67
[58] Field of Search .......... 175/293, 313, 323, 394, 175/395, 415; 166/173; 15/104.1 R, 104.2; 408/67; 409/137

[56] References Cited

U.S. PATENT DOCUMENTS

| 1,572,769 | 2/1926 | Clark | 15/104.2 X |
| 1,806,073 | 5/1931 | MacGregor et al. | 166/173 X |
| 3,310,113 | 3/1967 | Maness | 15/104.2 X |
| 3,351,136 | 11/1967 | Nelson | 166/173 |
| 3,372,763 | 3/1968 | Fischer | 175/323 X |
| 3,703,214 | 11/1972 | Boehm et al. | 175/323 X |
| 3,718,067 | 2/1973 | Fischer | 175/323 X |
| 4,562,608 | 1/1986 | Weir | 15/104.2 X |

FOREIGN PATENT DOCUMENTS 2403722  8/1974  Fed. Rep. of Germany.

Primary Examiner—William P. Neuder
Attorney, Agent, or Firm—Spencer & Frank

[57] ABSTRACT

A drilling tool which is suitable especially for clearing drill dust from a drillhole in rock-drilling work is provided. For this purpose, the spiral shank has brush elements (6, 17) which are arranged in the groove bottom of a conventional drilling tool or which themselves form spiral feed coils.

16 Claims, 3 Drawing Sheets

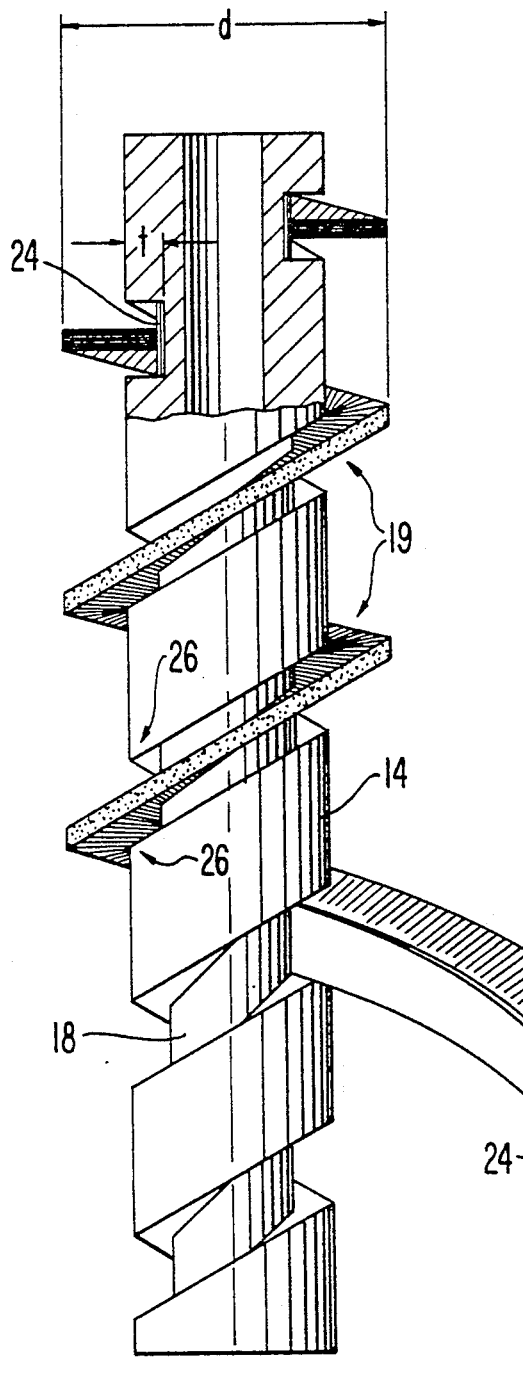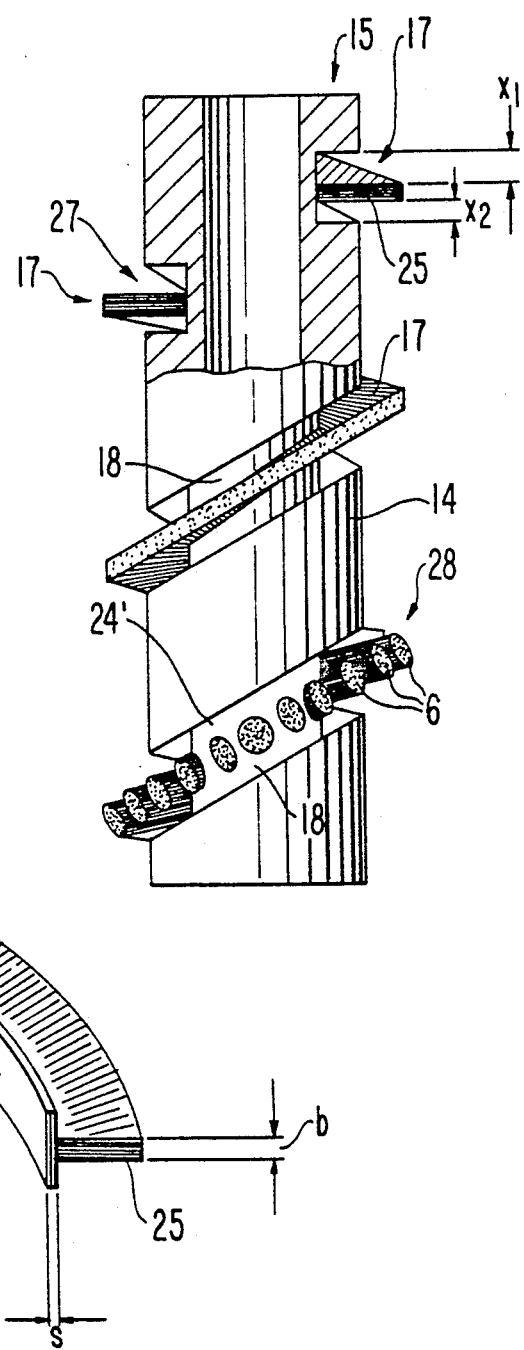

DRILLING TOOL

BACKGROUND OF THE INVENTION

When during drilling in rock or concrete, the drill dust or drillings obtained have to be transported out of the drillhole by means of a spiral shank. Fastening regulations for anchorages by means of dowels prescribe that the drill dust be removed completely from the drillhole. This can present difficulties, however, since, on the one hand, the drill dust can be caked in the drillhole and, on the other hand, suitable means for removing the drill dust, such as, for example, compressed air or the like, is not always available. Nevertheless, an anchorage by means of a dowel/screw connection depends essentially on the removal of the drill dust from the drillhole.

The outside diameter of the spiral shank of a conventional rock drill is always less than the nominal diameter of the drilling tool which is formed by the outside diameter of the carbide cutter. The spiral shank therefore cannot fully ensure that the drill dust is scraped off completely from the inner wall of the drillhole.

German Offenlegungsschrift 2,403,722 discloses a drilling tool having a push-on feed coil composed of a helically formed wire part made of rubber, synthetic rubber, pressed material or the like, the outer edge of the feed coil being narrow and flexible, so that a certain brush effect and consequently a cleaning of the drillhole will be obtained by means of these regions.

A disadvantage of this known drilling tool is the construction of these allegedly brushing members which is to be formed by a mere reduction of the wall thickness of an otherwise conventional feed coil. This would seem, in practice, to lead to a rapid wear of these regions, because they are not true brush-like members, but means which at most exert a certain scraping effect.

SUMMARY OF THE INVENTION

The object on which the invention is based is to provide a drilling tool, especially a rock drill, which guarantees a perfect discharge of the drill dust from the drill hole during the production process.

The above and other objects are accomplished according to the invention by the provision of a drilling tool for a hammer or percussion drilling machine for rock working, including: a drill shank; a drill head having a diameter defining a nominal drill diameter; a feed coil located between the drill shank and the drill head, the feed coil including a feed coil shank; and brush elements fastened to the feed coil shank in a spiral arrangement for conveying material drilled by the drilling tool away from the drill head and for cleaning a drill hole drilled by the drilling tool, the brush elements having an outside diameter extending at least as far as the nominal drill diameter.

Advantageous and expedient developments of the drilling tool according to the invention are possible as a result of the additional measures described herein.

The invention is based on the knowledge that only a true brush element composed of bristles can ensure a satisfactory and absolutely reliable cleaning of a drillhole, that is to say the arrangement according to the state of the art is hardly suitable for carrying out a reliable removal of the drill dust, especially under difficult conditions. In contrast to this, according to the invention there are true brush elements with a plurality of individual bristles which treat each region of the drill hole with a large effective brush surface. This makes it possible to ensure an absolutely reliable removal of the drill dust from the drillhole.

Furthermore, again according to the invention, the brush elements serve not only for cleaning the inner wall of the drillhole, but additionally also as a feed coil as a result of an appropriate helical arrangement of these brush elements. At the same time, either individual bristle bundles or elongate strip brushes, such as are known per se from other sectors of use, are employed as brush elements.

In an especially advantageous way, the basic idea according to the invention is put into practice on a drilling tool which is one-piece or which is equipped with a slip-on coil. At the same time, the brush elements can be attached either directly into the existing grooves of a conventional drilling tool or onto a cylindrical shank. In the latter case, the brush elements alone form the spiral flight. The same applies when this arrangement is provided on a slip-on feed coil.

In the development of the invention, the brush elements are adhesively bonded into bores or grooves or on to the cylindrical shank or are fastened by means of a snap connection, if appropriate with positive engagement. By means of a suitable foot or carrier strip, the brush elements can also be soldered on or, where a cylindrical brush foot is concerned, screwed in. The brush elements can thus be designed as exchangeable elements. The bristle or brush elements can also be secured by means of a material beading.

In a preferred embodiment of the invention, the bristle bundles are arranged in the groove bottom of the spiral shank in such a way that they overlap in the axial direction or that they are also placed spirally in the groove bottom. The axial overlap ensures that every region of the inner surface of the drillhole is reached.

In an advantageous development according to the invention, the strip brushes are arranged on a flexible carrier tape made of plastic or metal, and in turn this tape can be wound spirally in grooves or on a feed-coil shank. It is advantageous, at the same time, if the carrier tape is embedded completely in a groove so that the brushes cannot be sheared off.

It is expedient, furthermore, if the strip brushes are arranged asymmetrically in the grooves, so as to provide an additional drill-dust space by means of the groove.

Moreover, it is especially advantageous if the brushes are welded on to the plastic carrier tape or directly on to a tubular slip-on coil, the individual brushes penetrating approximately 5/10 mm into the basic material.

When strip brushes are used, it is advantageous, furthermore, if these are arranged spirally in segmental portions, and preferably metal webs as supporting feed-coil portions can be provided between the segmental portions.

Where a double-thread spiral shank is concerned, in the preferred embodiment of the invention one feed coil can be formed in a conventional way with a metal web or, as regards a slip-on coil, also with a plastic web and the second feed coil can be formed by brush elements.

The spiral shank or the feed coil can be produced from a tortioned or twisted basic material, the basic material having, before the twisting operation, axial longitudinal grooves or axially arranged bores for receiving the brush elements which, after the twisting, form a coil.

In specific cases, it may be sufficient if the brush elements are arranged only in the upper third of the spiral shank, since this can suffice for the cleaning of the drillhole. Basically, however, any fitting of the spiral shank with brush elements is possible.

In so far as the brush elements themselves are designed as a feed coil or feed-coil portions, the function of conveying the drill dust is performed by the brush elements themselves, and if appropriate, by the additional grooves for the strip brushes. Depending on the particular use, the individual bristle bundles or the strip-shaped strip brushes are suitable for this.

BRIEF DESCRIPTION OF THE DRAWINGS

Advantageous and expedient exemplary embodiments of the invention are illustrated in the drawing and explained in more detail in the following description. In the drawings:

FIG. 7 is an elevational longitudinal view which shows the operation of winding a strip brush on to a slip-on coil according to an embodiment of the invention.

FIG. 8 is a partial elevational longitudinal view in partial section which shows further features according to the invention.

DETAILED DESCRIPTION OF THE PREFERRED EMBODIMENTS

Figure 1:
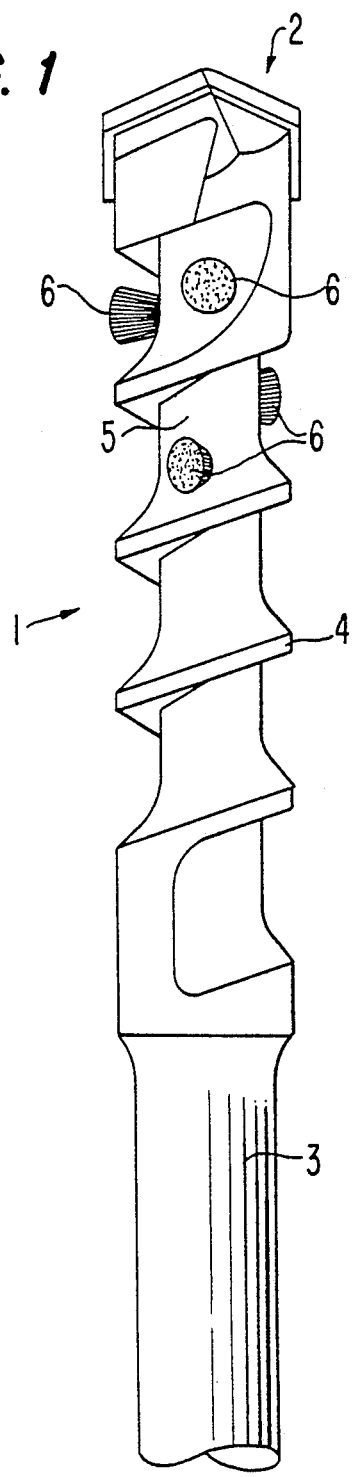
FIG. 1 is an elevational longitudinal view which shows a conventional rock drill with a metal feed coil and bristle bundles arranged in the drill-dust grooves in the upper region according to one embodiment of the invention.

The rock drill 1 illustrated in FIG. 1 is composed of a drilling head 2, a chucking shank 3 and a spiral shank or feed coil 4 located between them. In the exemplary embodiment according to FIG. 1, in such a conventional drilling tool bristle bundles 6 serving for clearing drill dust from the drillhole are embedded in the groove bottom 5 in the head region. The individual bristle bundles are attached in the groove bottom of the spiral shank in such a way that they do not impair or impair only insignificantly the conveyance of the drill dust by the feed coil 4.

Figure 3:
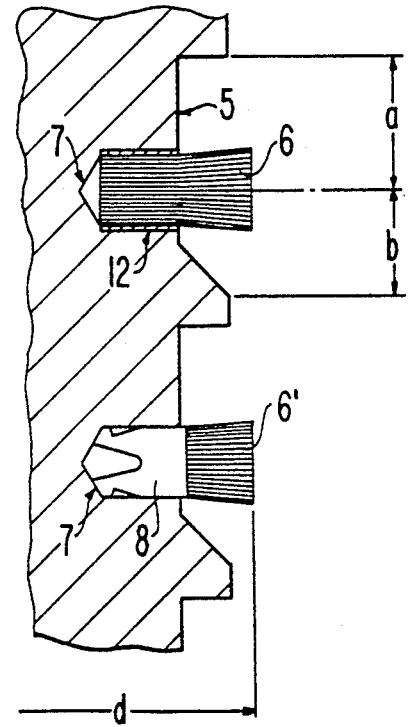
FIG. 3 is a partial sectional view which shows a cutout illustrating alternative possibilities for the method of fastening bristle bundles in bores according to an aspect of the invention.

As shown in FIG. 3, the individual bristle bundles are introduced into bores 7 in the groove bottom 5 of the spiral shank 4. The upper bristle bundle 6 in FIG. 3 is adhesively bonded into the bore 7 and the lower bristle bundle 6' is inserted into the bore 7 by means of a snap connection 8. Instead of the snap connection 8, there can also be a threaded connection.

The bristle bundle 6 or 6' is composed of a one-piece paintbrush-like round or conical bristle element made of plastic or metal, with a formed-on foot as a fastening element such as, for example, a screw head or snap connection 8 (shown with bundle 6') or soldering-in or bonding-in sleeve 12 (shown with bundle 6), as appropriate. Elements of this type are shown, for example, in the prospectus of Messrs Pedex and Co. GmbH of 6948 Wald-Michelbach.

According to the illustration in FIG. 3, the bristle bundle 6 can be arranged eccentrically in the drill-dust groove or the groove bottom 5 of a conventional drilling tool. In particular, the distance a, pointing towards the drill head, in the groove bottom is made greater than the remaining distance b, since this region serves for receiving the drill dust.

Figure 2:
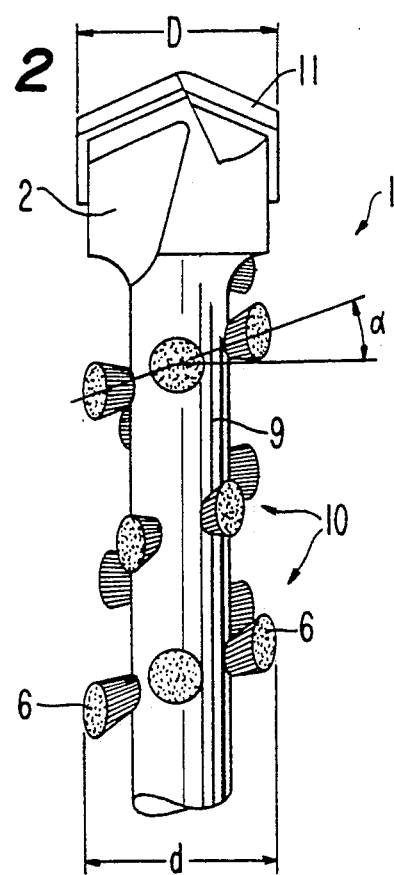
FIG. 2 is a partial elevational longitudinal view which shows a spiral arrangement of bristle bundles on a cylindrical feed-coil shank according to another embodiment of the invention.

In the exemplary embodiment according to FIG. 2, the individual bristle bundles 6 are arranged spirally on a smooth cylindrical feed-coil shank 9, so that they are disposed in the manner of a special feed coil 10 of the pitch angle α. The effective outside diameter (d) of the feed coil 10 formed by the bristle bundle 6 is equal to or somewhat larger than the nominal diameter (D) of the drilling tool, the nominal diameter being formed by the carbide cutting element 11 on the drill head 2. This guarantees that the inner wall of the drillhole is always reached by the brushes of the individual bristle bundles. This is also true of the exemplary embodiment according to FIG. 1.

Figure 4:
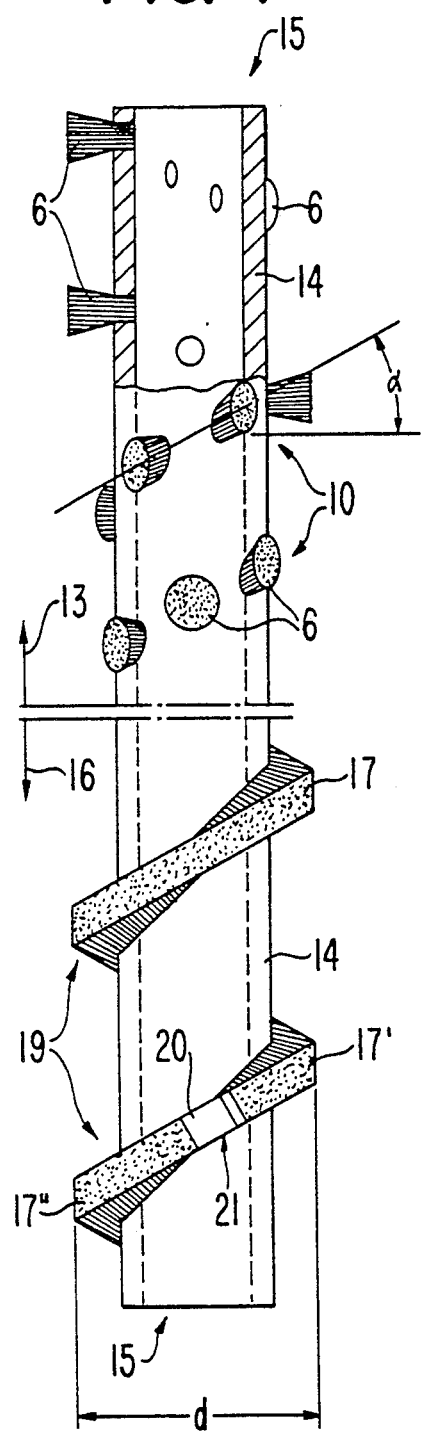
FIG. 4 is an elevational longitudinal view in partial section which shows a slip-on coil which can be slipped on to a cylindrical shank, with strip brushes in the lower region and bristle bundles in the upper region according to a further embodiment of the invention.

In the exemplary embodiment according to FIG. 4, in the upper region of the illustration (see the arrow 13) the bristle bundles 6 are introduced into bores in the wall 14 of a slip-on coil 15 hollow in the inner region. Once again, the bristle bundles 6 are arranged spirally, to form a feed coil 10 of the pitch angle α. This slip-on coil 15 can then be pushed on to a cylindrical drill shank in the customary way.

In the lower region of FIG. 4 (shown by arrow 16), instead of the individual bristle bundles 6 a so-called strip brush 17 is used, such as is also known in the trade by this designation for other intended uses. Such strip brushes possess an elongate U-shaped retention foot (carrier tape), in which the bristles made of special filling materials of plastic or metal or the like are embedded. They can easily be bent into any shape, particularly also spirally, so that they are also suitable for the present use.

The bristles of the bristle bundles 6 or of the strip brush 17 can also be welded on to the carrier tape, these being embedded approximately 5/10 mm into the basic material in a bead-like manner.

Figure 5:
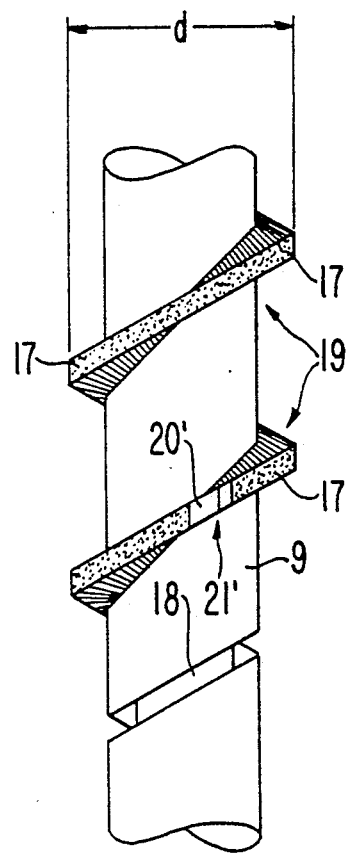
FIG. 5 is a partial elevational longitudinal view which shows an alternative embodiment to FIG. 2 with strip brushes instead of bristle bundles, and FIGS. 6a, b and c show horizontal sections through FIG. 2 or 5 showing different possibilities of groove formation for the brush elements.

To introduce the strip brush 17, continuous grooves (corresponding to grooves 18 in FIG. 5) may be made in the wall 14 of the slip-on coil 15 (FIG. 4), as also shown in the exemplary embodiment according to FIG. 5 with a solid material for a spiral drill shank 9. The strip brushes thus form a special feed coil 19 similar to the feed coil 10 of FIG. 2 and formed from the individual bristle bundles 6. This fed coil then likewise performs the function of transporting the drill dust out of the drillhole and of clearing drill dust from the drillhole wall.

As shown alternatively in the lower region of FIG. 4, the strip brush 17 can also be formed as individual interrupted segments 17', 17" and the interspace 20 between the segments 17', 17" can be left unfilled or be filled by means of a metal or plastic web 21 represented by broken lines. The web 21 has the form of a feed coil and assists the guidance of the feed coil.

The same is true of the embodiment according to FIG. 5, the cylindrical drill shank 9 here likewise being equipped with grooves 18 for receiving the strip brushes 17, if appropriate with additional interspaces 20' or webs 21'. As in the examples described previously, the outside diameter (d) of the strip brushes 17 is equal to or somewhat larger than the nominal diameter (D) of the drilling tool.

The strip brush 17 shown in FIGS. 4 and 5 can also be attached, especially adhesively bonded, directly on to a cylindrical feed-coil portion without an additional groove 18. For this purpose, the foot or carrier tape of the strip brush 17 is equipped with an adhesive tape or adhesive film which makes it possible to obtain a firm connection between the strip brush 17 and the cylindrical basic material. If appropriate, the foot or carrier tape can also be composed of metal and thereby be soldered on to the spiral shank. This fastening method allows any arrangement of the strip brush with any pitch, and a mounting of such a strip-brush feed coil is also possible on a drilling tool having a chucking shank or drill head of wider diameter than the feed-coil shank, thus no longer allowing an additional tubular feed coil to be pushed on.

Figure 6A:
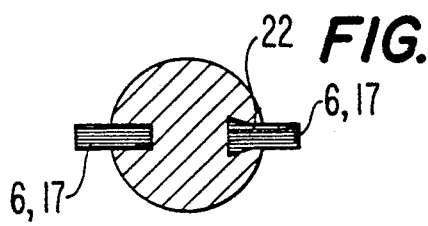
Figure 6B:
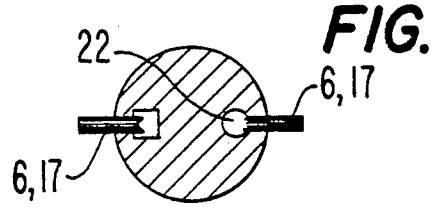
Figure 6C:
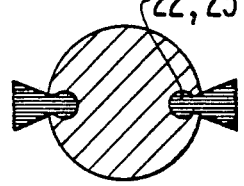

FIGS. 6a to c show a horizontal section through the spiral shank according to FIG. 2 or 5 illustrating different methods of fastening the bristle bundles or strip brushes. It is necessary to ensure, here, that the individual bristles are clamped or otherwise fastened firmly to the feed-coil shank. In the illustrations according to FIG. 6a to c, this purpose is served by undercuts 22 which make it possible to spread the rear part of the bristles and thus reinforce the connection. Furthermore, beadings 23 or other positive connections can be provided.

In so far as the feed-coil shank is produced as a result of a twisting (not shown in detail) of the drill shank, the initially axially extending longitudinal grooves for receiving the strip brushes can likewise be made with an undercut 22 according to FIG. 6 and the receiving foot of the strip brushes shaped accordingly. The strip brush can then be introduced into this guide groove in an axial advancing movement before or after the twisting of the drill shank.

In the event that the rock drill is designed as a double-thread feed coil, the feed coil 10 formed from the bristle bundles 6 or the feed coil 19 formed from the strip brushes 17 can constitute one of the two feed coils, whilst the second feed coil remains as a conventional metal web.

FIG. 7 once again illustrates the operation of winding a strip brush 17 on to a slip-on coil 15. For this purpose, the strip brush 17 has a carrier tape 24 made of plastic or metal, in which the bristles 25 are anchored. In the exemplary embodiment according to FIG. 7, there are deep turned-in grooves 18, into which the carrier tape 24 is countersunk completely. The depth t of the counter sink of the carrier tape 24 into the groove 18 will be approximately twice b (t~2×b), b being the width of the bristles 25. This guarantees that the flexibility of the bristles 25 in the groove 18 is always ensured. That is to say, the bristles 25, by being embedded in the groove or in the pocket 18, are prevented from shearing off at the drillhole edge as a result of the tilting of the machine. For this purpose, it is expedient if the corner edges 26 of the grooves 18 are rounded.

As shown in the uppermost part of FIG. 8, the bristles 25 can be arranged asymmetrically in the groove 18, that is to say the upper region $x_1$ is larger than the lower region $x_2$, thus providing an additional drill-dust space 27 above the bristles 25. This arrangement can also be transferred to FIG. 7.

Furthermore, the illustration in FIG. 8 shows, in the upper region, a strip brush 17 corresponding to the description according to FIG. 7, but without a carrier tape 24. The lower region shows an arrangement of bristle bundles 28 in a groove 18. However, these bristle bundles can likewise be welded on to a carrier tape 24' similar to the carrier tape 24 according to FIG. 7 and thus form a wind-on strip brush with individual bristle bundles 6.

It is also possible, on a feed coil, for both the strip brush 17 and a bristle-bundle strip 28 to be attached in corresponding grooves 18 or directly on to the feed-coil shank without grooves, and the arrangement can be made successively in the axial direction or, as regards a double-thread coil, one coil thread is composed of a strip brush 17 and the other coil thread of a strip-shaped bristle bundle 28.

The invention is not restricted to the exemplary embodiment illustrated and described. On the contrary, it also embraces all developments open to an average person skilled in the art, without their own inventive content.

We claim:

1. A drilling tool for a hammer or percussion drilling machine for rock working, comprising:
a drill shank;
a drill head having a diameter defining a nominal drill diameter;
a feed coil located between said drill shank and said drill head, said feed coil including a feed coil shank; and
brush element means fastened to said feed coil shank in a spiral arrangement for simultaneously conveying material drilled by said drilling tool away from said drill head and cleaning a drill hole drilled by said drilling tool, said brush element means comprising brush elements having an outside diameter extending at least as far as the nominal drill diameter.

2. A drilling tool as defined in claim 1, wherein said brush elements are arranged in cylindrical bristle bundles.

3. A drilling tool as defined in claim 2, wherein said bristle bundles are arranged to be overlapping in the axial direction of said feed coil.

4. A drilling tool as defined in claim 1, wherein said feed coil includes at least one spiral feed thread defining a spiral groove and said brush elements are spirally arranged in said groove.

5. A drilling tool as defined in claim 1, wherein said feed coil includes at least two feed threads, a first one of said feed threads comprising a conventional metal or plastic web and a second one of said feed threads being formed by said brush elements.

6. A drilling tool as defined in claim 1, wherein said brush elements are arranged in an elongate strip of brush elements.

7. A drilling tool as defined in claim 6, wherein said strip of brush elements comprises a spiral arrangement of segmental strip portions with adjacent portions defining an interspace therebetween, and further including a metal web forming a feed coil portion disposed in each said interspace.

8. A drilling tool as defined in claim 1, wherein said drill tool comprises a one-piece drilling tool and said brush elements are fastened to said one-piece drilling tool.

9. A drilling tool as defined in claim 1, wherein said feed coil includes a removable slip-on coil which slips onto said feed coil shank, and said brush elements are fastened to said slip-on coil.

10. A drilling tool as defined in claim 1, and further including a flexible carrier tape, said brush elements being fastened to said tape, and said tape being wound spirally around said feed coil shank and fastened thereto.

11. A drilling tool as defined in claim 1, wherein said feed coil is formed of a twisted basic material which prior to twisting includes an axial groove for receiving said brush elements.

12. A drilling tool as defined in claim 1, wherein said feed coil is formed of a twisted basic material which prior to twisting includes axially arranged bores for receiving said brush elements.

13. A drilling tool as defined in claim 1, wherein said brush elements are arranged only in an upper third portion of said feed coil adjacent said drill head.

14. A drilling tool as defined in claim 1, wherein said feed coil is provided with a spiral groove and said brush elements are fastened in said groove.

15. A drilling tool as defined in claim 1, wherein said feed coil is provide with spirally arranged bores and said brush elements are fastened in said bores.

16. A drilling tool as defined in claim 1, and further including holding means for holding said brush elements, said holding means including fastening means for fastening said brush elements to said feed coil.

* * * * *